Sept. 11, 1928.
C. O. GUERNSEY
1,684,314
DRIVING MECHANISM FOR VEHICLES
Original Filed Nov. 3, 1924   5 Sheets-Sheet 2
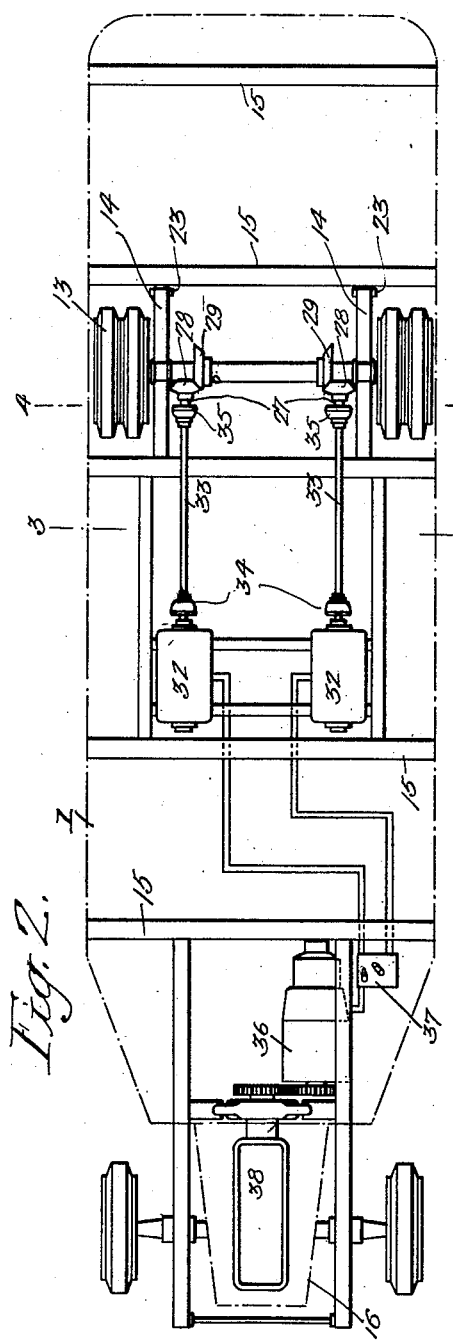
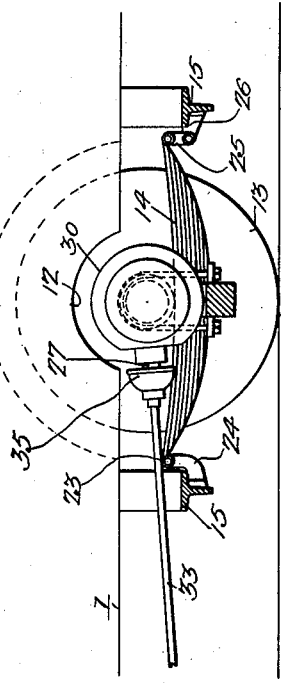
Inventor,
Charles O Guernsey,
by his Attorneys,
Howson & Howson Sept. 11, 1928.   1,684,314
C. O. GUERNSEY
DRIVING MECHANISM FOR VEHICLES
Original Filed Nov. 3, 1924   5 Sheets-Sheet 3
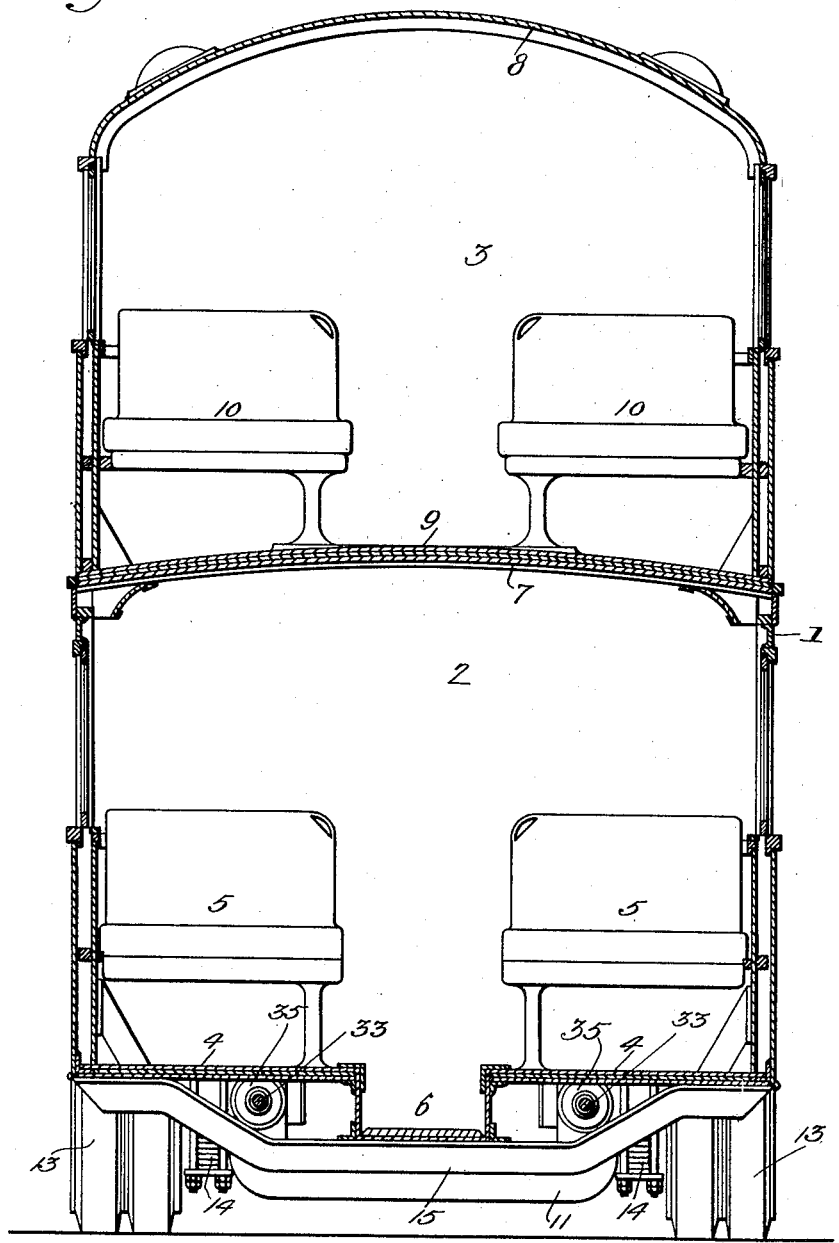

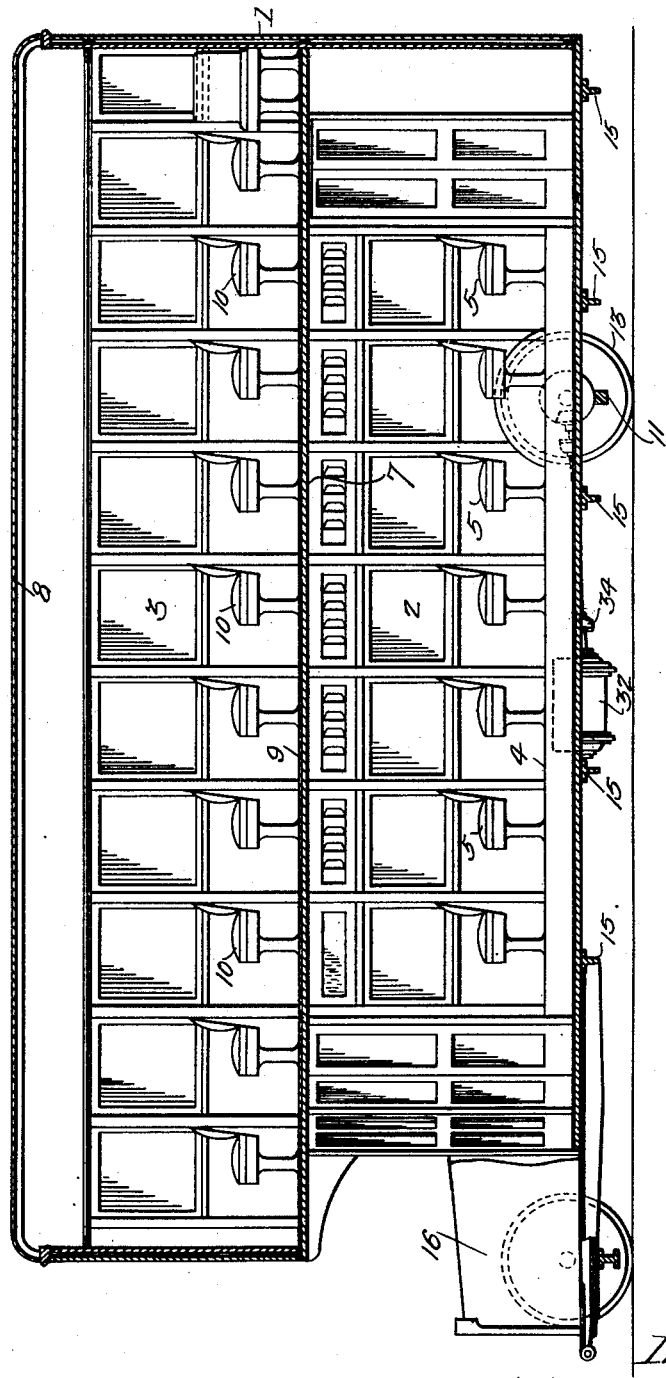

Sept. 11, 1928.

C. O. GUERNSEY 1,684,314

DRIVING MECHANISM FOR VEHICLES

Original Filed Nov. 3, 1924     5 Sheets-Sheet 4

Inventor:—
Charles O. Guernsey
by his Attorneys,
Howson & Howson

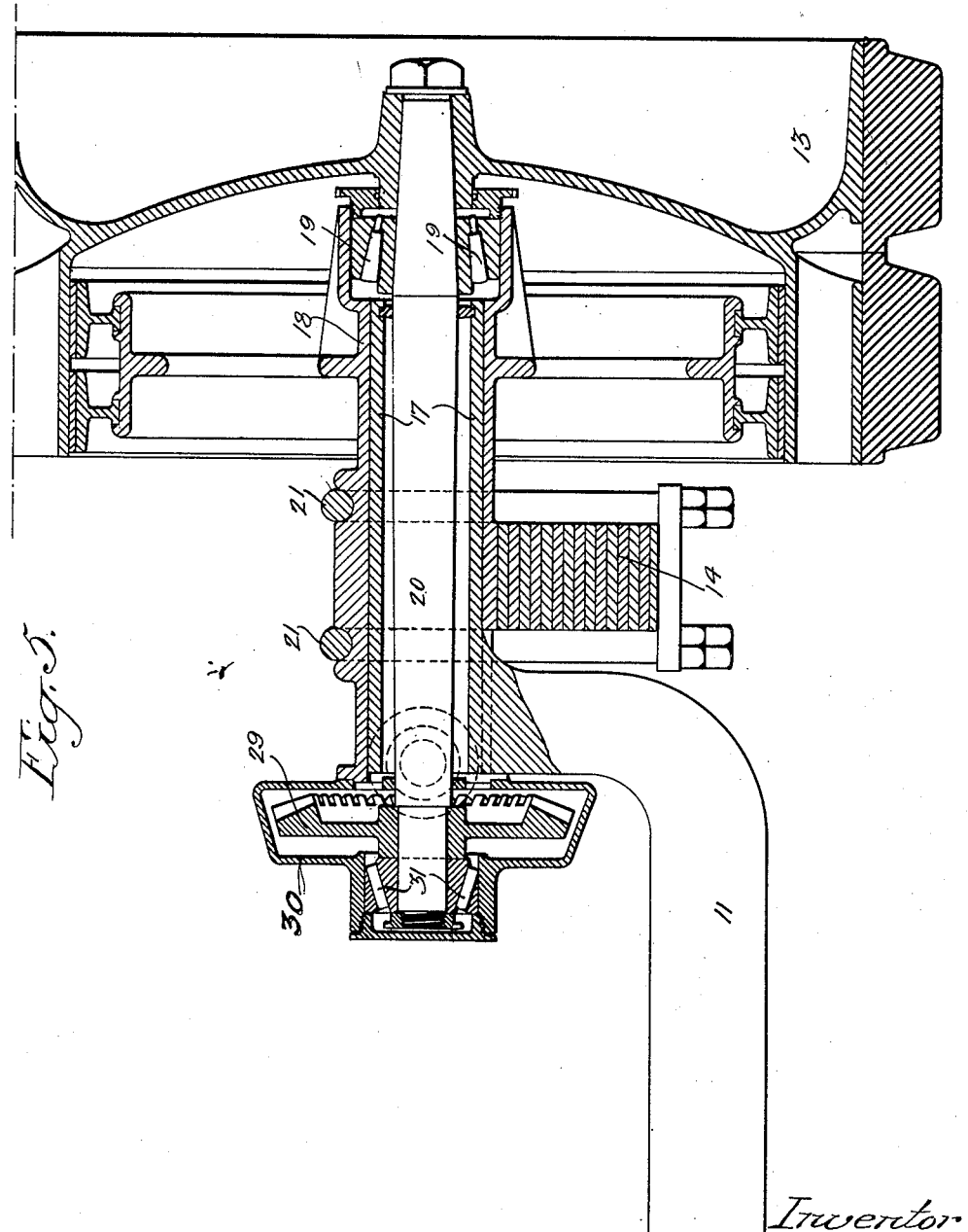

Patented Sept. 11, 1928.

1,684,314

UNITED STATES PATENT OFFICE.

CHARLES O. GUERNSEY, OF PHILADELPHIA, PENNSYLVANIA.

DRIVING MECHANISM FOR VEHICLES.

Original application filed November 3, 1924, Serial No. 747,645. Divided and this application filed March 3, 1927. Serial No. 172,362.

This invention relates to certain improvements in omnibuses, or other passenger vehicles, especially those having a double-decked body.

One object of this invention is to construct an omnibus so that its height is reduced and the center of gravity is lowered.

Another object is to construct the driving mechanism of an omnibus so that the central aisle between the seat sections may be disposed below the level of the floor supporting the seats.

Another object is to provide an omnibus, having a body provided with a longitudinal central aisle that is disposed below the level of the floor supporting the seats with independent driving mechanism for each rear wheel located on each side of the central aisle beneath the floor supporting the seats.

With these and other objects in view, the invention further consists in the details of construction and the arrangement of parts hereinafter described and claimed, and illustrated in the accompanying drawings, wherein:—

Figure 1 is a longitudinal section through an omnibus illustrating my invention;

Fig. 2 is a diagrammatic plan of the driving mechanism;

Fig. 3 is a vertical transverse section taken approximately on the line 3—3 of Fig. 2;

Fig. 5 is an enlarged section showing a detail of one of the rear wheels; and

Fig. 6 is a detail section, showing the rear axle and the supporting springs for the body.

Figure 4:
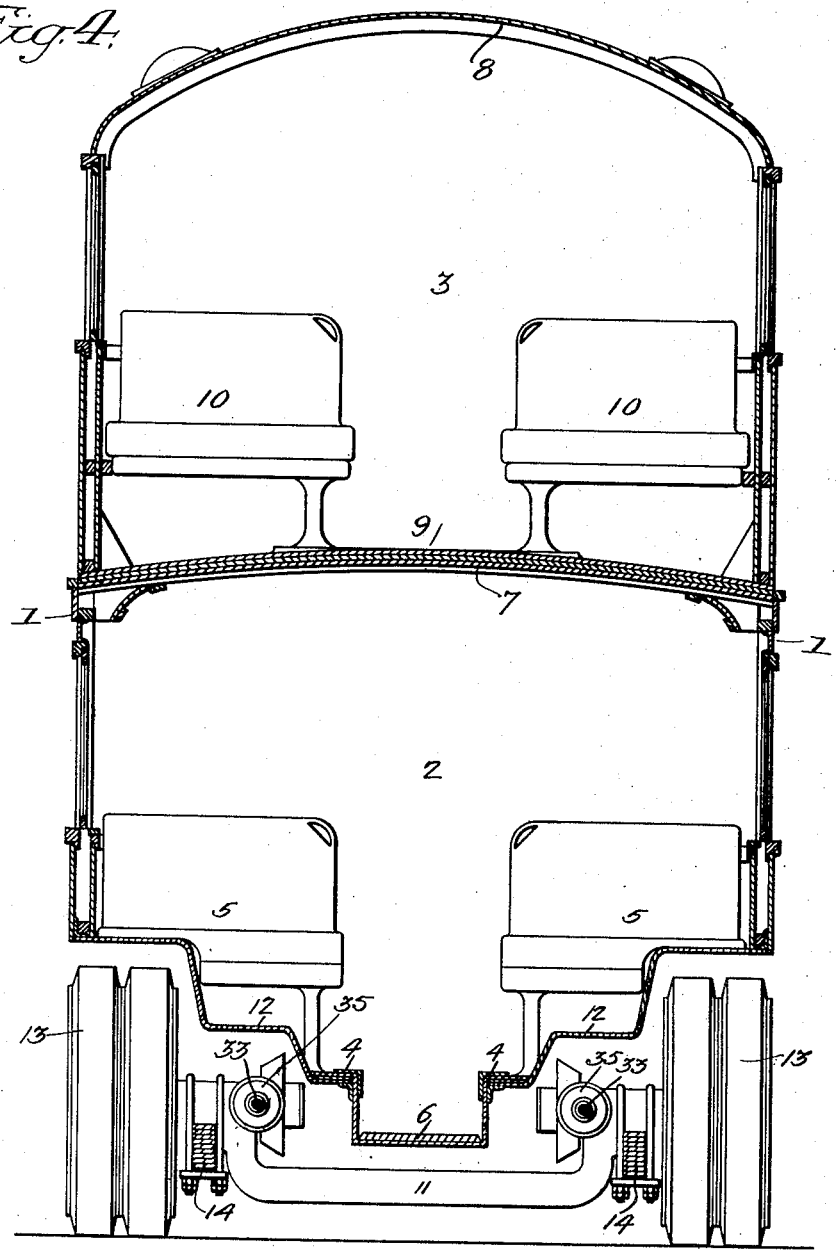
Fig. 4 is a similar view as seen from the line 4—4 of Fig. 2.

The body of the omnibus 1 is provided with a lower deck 2 and an upper deck 3. The floor of the lower deck has portions 4 at each side on which the seat structures 5 are located. Between the side portions 4 is a central aisle 6, the floor of which is disposed at a considerable distance below the floor of the side portions 4.

The ceiling 7 of the lower deck is of sufficient height to permit a person to pass through the aisle, but the height is not sufficient to allow a person to stand upright on the portions 4 of the floor. A passenger on taking a seat, or on leaving it, stoops sufficiently to clear the ceiling.

The roof 8 of the upper deck may be any height from the floor 9 of the upper deck, as desired. In the present instance, the seat sections 10 of the upper deck are located at each side of the center to form a longitudinal aisle throughout the length thereof.

At the rear, the lower floor above the driving axle 11, is shaped as indicated at 12 (see Fig. 4), so as to clear the rear wheels 13, springs 14, and the driving mechanism. The portions 12 of the body are preferably made of sheet metal shaped to conform to the shape of the wheels. Transverse braces 15 are located at intervals throughout the length of the body, and these braces are so formed as to support the depressed aisle 6 and to stiffen the structure.

The front end of the vehicle has a hood 16, which encloses the motor. In the present instance, the upper deck overhangs the motor (see Fig. 1), although the general design of the omnibus body may be modified without departing from the essential features of the invention.

The axle 11, intermediate its length, is depressed in order to clear the floor of the depressed aisle 6. The axle has a tubular portion 17, on which is mounted a housing 18 that extends into the wheels 13, as illustrated in Fig. 5. At the extreme end of the housing is a roller bearing 19, of any suitable type, for a short driving shaft 20 that extends through the tubular portion of the axle. The end of this shaft is tapered and secured to the wheel 13.

The housing 18 of the axle 11 is grooved for receiving U-shaped clips 21 that clamp the springs 14 to the axle.

One end of each spring is pivotally connected, as at 23, to a bracket 24 fixed to one of the transverse braces 15, while the other end of the spring is connected by a shackle 25 to a bracket 26 on one of the transverse braces.

Arranged longitudinally of the omnibus and disposed beneath the floor of the portions 4 on each side of the depressed aisle 6 are drive shafts 27 the rear end of which carry a bevel gear 28 that meshes with a bevel gear 29 mounted on the inner end of the shaft 20. The inner end of the shaft and the gears are enclosed by a housing 30. A roller bearing 31 is mounted in the housing for supporting the inner end of the shaft 20.

The shafts 27 are connected to the shafts of electric motors 32 by shafts 33, having universal joints 34 and 35. The motors 32 derive current from a generator 36 through a controller 37. The generator is located at the forward end of the omnibus, being driven from an internal combustion engine 38 located under the hood 16.

By the arrangement illustrated in Fig. 2, clearance is provided for the depressed aisle 6, as the driving wheels 13 are driven from independent motors 32.

While one method of driving the rear axle shaft is described, the driving mechanism may be modified without departing from the spirit of the invention.

The invention is illustrated as applied to a vehicle of the omnibus type, having an upper deck and a lower deck. It will be understood, however, that the invention can be applied to the vehicle having a single deck, when it is desired to provide a vehicle with a lower roof.

I claim:—

1. The combination in a vehicle, of a body portion having a floor; spaced seat structures mounted on the floor at each side of the car; a depressed longitudinal aisle in the floor and between the seats; a depressed axle extending under the depressed aisle; and driving mechanism disposed on each side of said aisle and connected to said axle, said mechanism being positioned above the floor of said aisle and beneath the seat structure body portion.

2. The combination in a vehicle, of a body having a floor provided with a depressed aisle extending longitudinally through the center of the vehicle, an axle depressed at the center and extending below the depressed aisle of the floor, wheels mounted on the axle, and independent means for driving each wheel, said means extending longitudinally on each side of the said aisle below the floor of the vehicle.

3. The combination in a passenger vehicle, of a body having a floor provided with a depressed longitudinal aisle, an axle extending under the depressed portion of the floor, a driving wheel at each end of the axle, and means for driving the wheels, said means including a longitudinal shaft located at one side of the depressed aisle and under the floor.

4. The combination in a vehicle, of a body having a depressed longitudinal aisle with transversely disposed seat structures disposed on each side thereof and elevated with respect thereto, an axle disposed transversely of the body and conforming to the contour with the bottom thereof with a depressed portion disposed beneath the depressed aisle, and driving mechanism disposed on each side of said aisle and connected to said axle, said mechanism being positioned above the floor of said aisle and beneath the seat structure body portion.

CHARLES O. GUERNSEY.